(12) United States Patent
Livne et al.

(10) Patent No.: US 7,528,858 B2
(45) Date of Patent: May 5, 2009

(54) HIGH PERFORMANCE DYNAMIC MIRROR

(75) Inventors: Haim Livne, Rehovot (IL); Michael Plotkin, Rehovot (IL); Craig Breen, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 10/586,957

(22) PCT Filed: Feb. 5, 2004

(86) PCT No.: PCT/IL2004/000118

§ 371 (c)(1),
(2), (4) Date: Jul. 25, 2006

(87) PCT Pub. No.: WO2005/076200

PCT Pub. Date: Aug. 18, 2005

(65) Prior Publication Data

US 2007/0159676 A1 Jul. 12, 2007

(51) Int. Cl.
*B41J 2/47* (2006.01)
(52) U.S. Cl. ...................... 347/248; 347/234
(58) Field of Classification Search ................. 347/256, 347/248, 234
See application file for complete search history.

(56) References Cited

U.S. PATENT DOCUMENTS

| 4,453,170 | A | 6/1984 | Arao |
| 4,750,045 | A | 6/1988 | Ohara et al. |
| 5,268,687 | A | 12/1993 | Peled et al. |
| 2002/0093258 | A1* | 7/2002 | Brown et al. .............. 310/68 C |
| 2002/0167584 | A1* | 11/2002 | Zelenka ..................... 347/234 |
| 2003/0033112 | A1* | 2/2003 | Vogler et al. ................ 702/150 |
| 2003/0234856 | A1* | 12/2003 | Jin ............................. 347/238 |

* cited by examiner

*Primary Examiner*—Huan H Tran

(57) ABSTRACT

An imager comprising a photosensitive surface; a light source which produces at least one scanning light beam; a deflector, arranged to deflect the at least one scanning light beam onto the photosensitive surface; and a sensor which measures the orientation of the deflector. The imager also comprises a controller operative to determine a placement error of said at least one scanning beam on the photosensitive surface, responsive to the orientation measurement by the sensor: and an actuator, responsive to the displacement error, and arranged to change the direction of deflection of the at least one light beam by the deflector. The sensor is configured to measure the orientation of the deflector substantially at a null in a vibrational mode of the deflector.

22 Claims, 2 Drawing Sheets

HIGH PERFORMANCE DYNAMIC MIRROR

FIELD OF THE INVENTION

The field of the invention is laser printers.

BACKGROUND OF THE INVENTION

In laser printers, a modulated light beam (or a plurality of beams) scans the surface of a moving photosensitive surface such as a rotating cylindrical photoreceptor to produce an image. The light beam typically scans the surface in the axial (scan) direction to produce each line of the image, while the cylinder rotates so that each line falls on a different cross-scan location on the surface. In some systems multiple lines are scanned simultaneously.

U.S. Pat. No. 5,268,687, to Peled et al, the disclosure of which is incorporated herein by reference, describes a printer in which errors in the rotational position of the cylinder or in the timing of the scan are compensated for by reflecting the light beam from a movable mirror, which adjusts the cross-scan position of the light beam. FIG. 1 of the present application shows FIG. 1 of the Peled et al. patent. The figure shows a cylinder 108, a source 110 for a light beam 111, and a movable mirror 112, mounted between a bearing 114 and a servo-motor 118 which rotates the mirror over a limited range on its axis. As can be seen from the drawing, the mirror is much longer than it is wide, and is of an appropriate length so that light beam 111 can reflect from it at any position in the axial scan of the light beam.

A feedback loop 129 uses the measured difference between the rotational position of the cylinder and an expected position at the beginning of a scan, as well as the measured orientation of the mirror, to drive servo-motor 118 which controls the orientation of the mirror, and hence the azimuthal location 116 where the light beam hits the surface of the cylinder. The feedback loop includes a controller 124 which receives signals about the rotational position of the cylinder from sensor 109, and signals about the timing of the scan from light source 110.

Hence controller 124 can determine the difference between the expected and actual rotational position of the cylinder at the beginning of each scan. Feedback loop 129 also includes a mirror control 120, which uses output from controller 124 to instruct servo-motor 118 how far and in what direction to rotate the mirror, and uses feedback from a sensor 122 which senses the orientation of the mirror.

SUMMARY OF THE INVENTION

An error-compensating system similar to that shown in FIG. 1, may operate well so long as no mechanical vibratory modes of the long mirror are excited by the control system.

For example, if a certain overall closed loop bandwidth of the feedback loop is desired and the system position error should be decreased by a large factor, then a high open loop gain over the frequency range of the closed loop bandwidth may be required to achieve this. To achieve this goal and still have sufficient phase margin in a real closed loop control system design, the actual open loop Band Width (BW) is typically much higher than the closed loop BW, for example 3 to 5 times higher.

If any resonance exists within a frequency range beyond the closed loop BW, for example up to ten to twenty times higher than the closed loop bandwidth. This could result in a loop gain larger than 1 at this high frequency range, with positive feedback, thus causing positive feedback that might saturate the control system, resulting in oscillations.

In order to avoid oscillation of the system caused by positive feedback of a torsional (or other) vibration, the lowest (and predominant) vibrational mode of the mirror, generally a torsional mode, must occur at a frequency sufficiently above this bandwidth so that the closed loop gain for this mode is less than one.

As an example, in the mirror presently used in the H-P INDIGO 1000 press printer, the lowest order torsional mode has a frequency of about 6,000 Hz. As the required speed of correction increases (for example, with increased printing speed), in order to obtain good performance of the feedback loop it is desirable to use information from the optical sensor at frequencies that extend up to 6 kHz and above. This can result in positive feedback at the frequency of the first torsional mode, leading to uncontrolled torsional vibration of the mirror.

The positive feedback at the torsional mode could, in principle, be avoided by using a notch filter (or other method), which reduces the amplitude of the sensor signal at frequencies close to the resonant frequency. However, such a solution still degrades the performance of the feedback loop within the desired frequency range because of the limited gain that can be used and the filter's detrimental impact on the phase margin. Furthermore, the frequency of the first torsional mode of the mirror can vary with different systems and can even drift over time, so the notch filter might have to be adjusted individually for each system, and/or periodically readjusted.

An aspect of an embodiment of the invention concerns a method and apparatus for feedback control of the orientation of an error-compensating deflector (which can be, for example, a mirror, a reflective prism or a refractive prism) in a laser printer, in which a sensor measures the orientation of the deflector substantially at a node in dominant vibratory mode, for example a torsional mode. Unlike the frequency of the first torsional mode, which varies from unit to unit, the position of the null in the first torsional mode is robust, found at substantially the same position in all systems manufactured to the same specifications, and does not drift over time.

By measuring the orientation of the deflector substantially at a null of the torsional mode, positive feedback of the mode is avoided, and the control loop can achieve good performance. As used herein, "substantially at a null" means close enough to a null so that non-negligible positive feedback of the mode is avoided. The term non-negligible, as used herein, is an amount which causes a closed loop gain high enough to cause vibrations or ringing. Typically, the deflector is much longer than it is wide and has uniform cross-section, and the first torsional mode has a null located near the center of the deflector.

For a different deflector configuration, other vibrational modes may have positive feedback, and the orientation of the deflector is optionally measured substantially at a null of one of those modes. However, for a (deflector) mirror typical of this kind of system, long, thin, and supported in a way that allows the ends of the mirror to turn freely but not to easily move axially or laterally, the lowest frequency mode, and the mode most likely to have positive feedback, is likely to be the first torsional mode.

There is thus provided, in accordance with an embodiment of the invention, an imager comprising:

a) a photosensitive surface;

b) a light source which produces at least one scanning light beam;

c) a deflector, arranged to deflect the at least one scanning light beam onto the photosensitive surface;

d) a sensor which measures the orientation of the deflector;

e) a controller operative to determine a placement error of said at least one scanning beam on the photosensitive surface, responsive to the orientation measurement by the sensor; and f) an actuator, responsive to the displacement error, and arranged to change the direction of deflection of the at least one light beam by the deflector, wherein the sensor is configured to measure the orientation of the deflector substantially at a null in a vibrational mode of the deflector.

Optionally, the photosensitive surface is a moving surface. Optionally, the controller determines said placement error relative to a desired position of said photosensitive surface In an embodiment of the invention, the moving photosensitive surface comprises the surface of a rotating cylinder. Optionally, the moving photosensitive surface comprises the surface of a moving belt.

In an embodiment of the invention, the sensor is an optical sensor. Optionally, the sensor comprises:

a) a second light source which produces a second light beam;

b) a second deflector, fixed to the deflector or a support of the deflector, which deflects the second light beam; and c) an optical position sensor which measures a position of the deflected second light beam.

Optionally, the second light source comprises a laser, and the second light beam strikes a surface of the optical position sensor at an oblique angle, thereby avoiding reflection of the second light beam from the optical position sensor back into the laser.

In an embodiment of the invention, the vibrational mode is the lowest frequency vibrational mode of the deflector.

In an embodiment of the invention, the vibrational mode is a torsional mode.

In an embodiment of the invention, the null is substantially at the center of the deflector in the scan direction.

In an embodiment of the invention, the deflection of the at least one scanning light beam is controlled in a closed loop control system, utilizing said sensor measurement as feedback signal.

In an embodiment of the invention the feedback would be positive at the frequency of the vibrational mode if the sensor were to measure the deflector at a maximum of the vibrational mode.

In an embodiment of the invention, the actuator is attached to at least one end of the deflector in the scan direction, and rotates the deflector around an axis substantially parallel to the scan direction, and where the sensor measures the orientation of the deflector.

In various embodiments of the invention, the deflector is a mirror or a prism.

In various embodiments of the invention, the imager is a printer or a copier.

There is further provided, in accordance with an embodiment of the invention, a method of producing an image on a photosensitive surface in an imager, wherein a cross-scan position of a scan line with respect to the photosensitive surface may vary from an expected position, the method comprising:

a) deflecting a scanning light beam, utilizing a deflector, such that the deflected scanning light beam falls on the photosensitive surface, thereby producing a plurality of lines of the image;

c) changing the orientation of the deflector, to correct an error in the cross-scan position of the lines on the photosensitive surface, caused by said variation;

d) measuring the orientation of the deflector; and e) controlling the change in the orientation of the deflector in response to the measurement of orientation of the deflector, wherein the measurement of the orientation of the deflector is made at a location on the deflector in the vicinity of a null of a vibrational mode of the deflector.

In an embodiment of the invention, the photosensitive surface is a moving surface. Optionally, the method includes:

a) measuring the position of the photosensitive surface; and b) finding a difference between the measured position or orientation and an expected position or orientation;

wherein changing the orientation of the deflector comprises changing the orientation by an amount and in a direction which depends on said difference.

In various embodiments of the invention, the moving photosensitive surface comprises the surface of a rotating cylinder or the surface of a moving belt.

In an embodiment of the invention, the measurement is optical. Optionally, the measurement comprises:

a) reflecting a second light beam from a second deflector fixed to the deflector or to a support of the deflector; and b) measuring a position of the reflected second light beam.

In an embodiment of the invention, the vibrational mode is the lowest frequency vibrational mode.

In an embodiment of the invention, the vibrational mode is a torsional mode.

In an embodiment of the invention, the null is substantially at the center of the deflector in the scan direction.

In an embodiment of the invention, the deflection of the at least one scanning light beam is controlled in a closed loop control system, utilizing said measurement of deflection as feedback signal. In an embodiment of the invention, the feedback would be positive at the frequency of the vibrational mode if the measurement were made at a location on the deflector at a maximum of the vibrational mode.

In various embodiments of the invention, the deflector is a mirror or a prism.

In various embodiments of the invention, the imager is a printer or a copier.

BRIEF DESCRIPTION OF THE DRAWINGS

Exemplary embodiments of the invention are described in the following sections with reference to the drawings, which are generally not to scale.

DETAILED DESCRIPTION OF EXEMPLARY EMBODIMENTS

Figure 1:
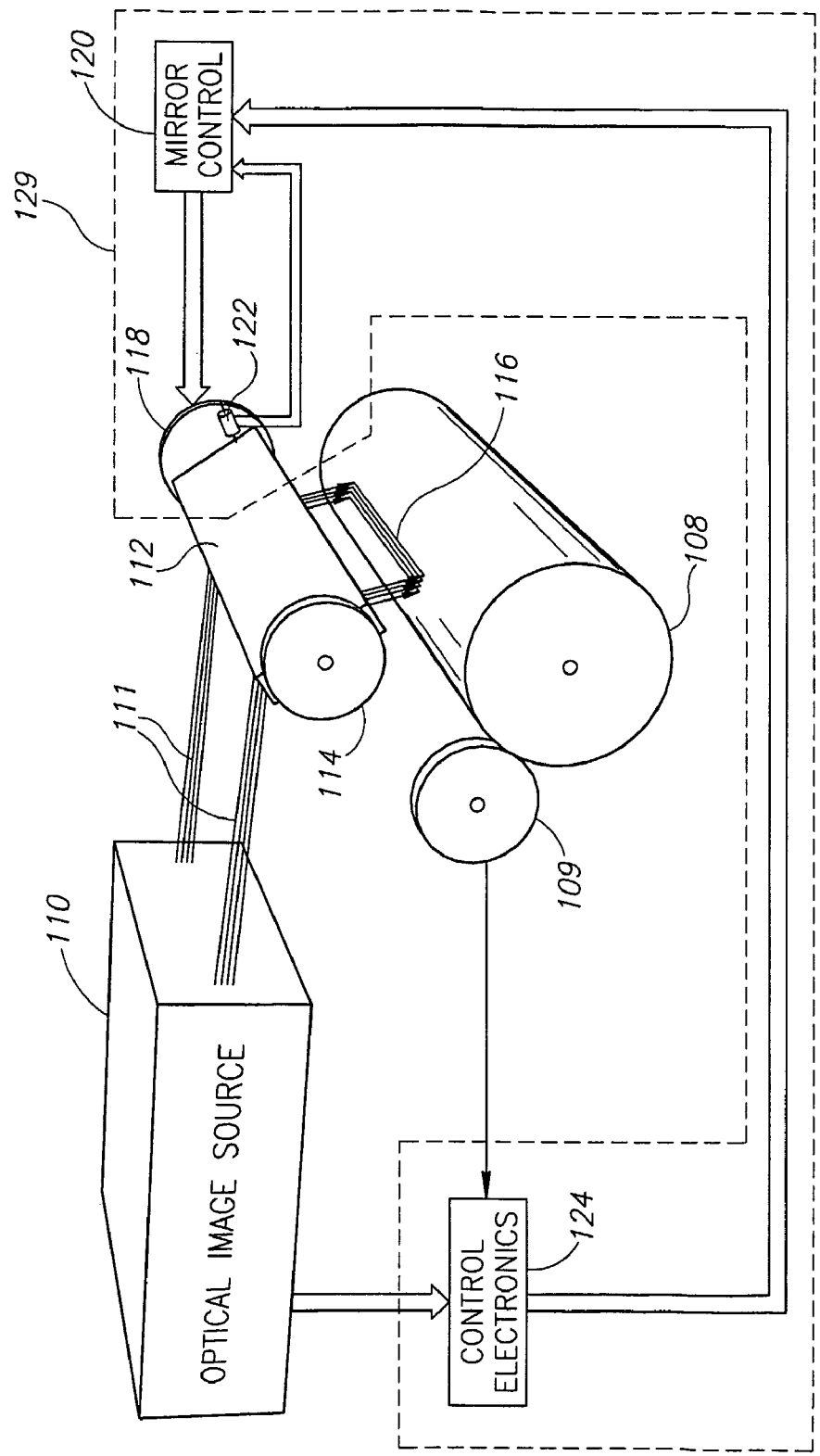
FIG. 1 is a perspective view of a photosensitive cylinder in a laser printer with a movable mirror for error compensation, according to the prior art.
Figure 2:
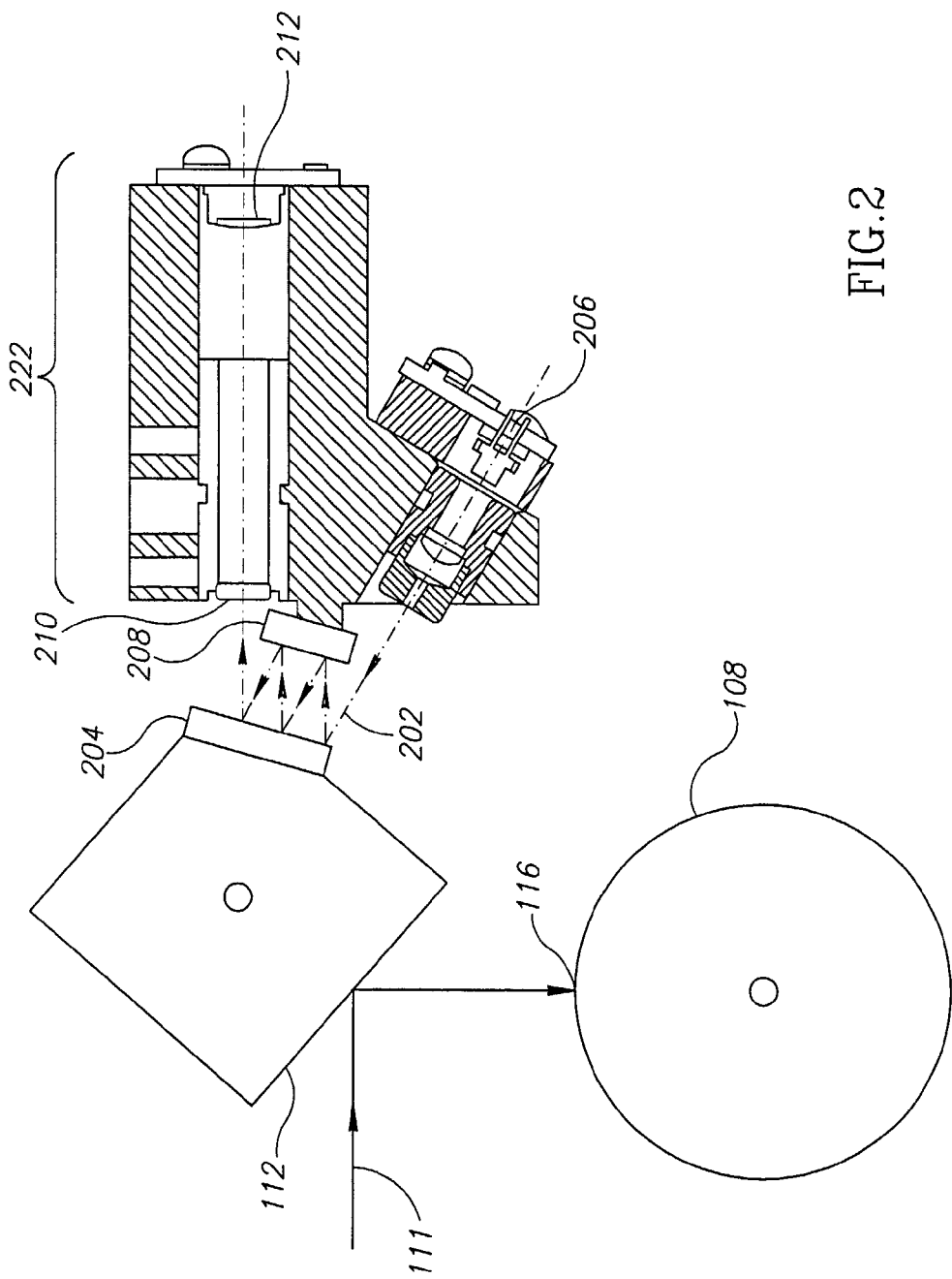
FIG. 2 is a cross-sectional view of a movable mirror similar to that shown in FIG. 1, and an optical sensor used to measure the orientation of the mirror, according to an exemplary embodiment of the invention.

FIG. 2 shows a cross-section of a movable mirror 112 (as an example of a deflector) such as that shown in FIG. 1, used for compensating for errors in the rotational position of a photosensitive cylinder, as described above. In other respects the system in which movable mirror 112 can be used can be similar to that shown in FIG. 1. Alternatively, mirror of FIG. 2 can be used in a scanner in which movement in the cross-scan direction is provided by the mirror itself. While a photosensitive cylinder is shown, the photosensitive surface can be the surface of a belt or even of a flat or curved plate. As in FIG. 1, a light beam 111 reflects from the mirror onto a cylinder 108, and changes in orientation of the mirror correct an error in the position of the beam on the surface of the cylinder. The mirror in FIG. 2 has approximately a square cross-section, which provides greater rigidity to vibrational modes than the high aspect ratio cross-section shown in FIG. 1. Alternatively, the mirror has a cross-section like that shown in FIG. 1, or a different cross-sectional shape. The cross-section is taken at an axial position halfway between the ends of the mirror. A sensor 222 measures the orientation of mirror 112, and provides input for a feedback circuit controlling the mirror, as described for FIG. 1. In contrast to FIG. 1, where sensor 122 is near one end of the mirror where the amplitude of the first torsional mode is near its maximum, sensor 222 measures the mirror position or angle at or near a null of the first torsional mode, at which the deflector is not affected by the vibration, and thus is insensitive to this mode. Hence there is no non-negligible positive feedback at the frequency of the first torsional mode, which can lead to uncontrolled torsional vibrations of the mirror.

Sensor 222 works by reflecting a light beam 202 off a small mirror 204 attached rigidly to movable mirror 112, for example at the back of mirror 112, where it will not interfere with the reflection of light beam 111 off the face of mirror 112.

A laser diode 206 generates light beam 202, which reflects off small mirror 204. Optionally, a second small mirror 208 is mounted on sensor 222, and light beam 202 reflects one or more times between mirrors 204 and 208, before reaching an aperture 210. Optionally, aperture 210 has a lens which focuses light beam 202 on a detector 212 which is, for example, a position sensitive detector (PSD). Alternatively, light beam 202 strikes PSD 212 directly, without focusing. PSD 212 produces an output signal dependent on the position where light beam 202 strikes PSD 212. This position depends on the angle of orientation of mirror 204, and hence on the angle of orientation of mirror 112. Hence the output signal of sensor 222 depends on the orientation of mirror 112.

Optionally, light beam 202 reflects only once from mirror 204 and goes directly to lens 210, without reflecting from mirror 208. However, having light beam 202 reflect from mirror 208 and then reflect again from mirror 204 makes the position of light beam 202 on PSD 212 more sensitive to the orientation of mirror 204, and the sensitivity is greater the more times light beam 202 bounces between mirror 204 and mirror 208.

In an embodiment of the invention, the angle of incidence of the light beam on the PSD is other than normal to avoid reflection back into the laser. Alternatively or additionally, the beam is not focused to reduce the strength of any reflection back into the laser. The presence of such reflection back into the laser may cause mode jumping. Some defocusing may be helpful in reducing deleterious effects of uneven sensitivity of the PSD with position.

Optionally, any other means known to the art is used to detect the position of light beam 202, instead of using a PSD such as that shown. For example, using split-detector where half of the power of light beam 202 falls on each of two photocells located side by side, and the difference in the output of the two photocells measures the position of the center of light beam 202. Optionally, a light source other than a laser diode is used.

Alternatively, instead of being an optical sensor, sensor 222 uses any other method known to the art for measuring the orientation of mirror 112. For example, sensor 222 is capacitive or inductive proximity sensor which measures the distance to a target fixed to the back of mirror 112, or sensor 222 comprises a strain gauge, one end of which touches mirror 112. Or, sensor 222 is an optical sensor, but uses interferometry to measure the distance to a target mounted on mirror 112. Using an optical sensor and a PSD, as described above, has the potential advantage that sensor 222 has a relatively wide range, and need not be in mechanical contact with mirror 112, or even be very close to mirror 112. The greater precision possible with other sensing methods may not be needed, and in any case the precision can be increased, if necessary, by changing the geometry of the sensor to increase the number of bounces between mirror 204 and mirror 208.

Optionally, mirror 112 adjusts the position of reflected light beam 111 on the photoreceptor by translating, instead or in addition to rotating. In this case, sensor 222 optionally measures the position of mirror 112, or an appropriate combination of the position and orientation, instead of only measuring the orientation.

The invention has been described in the context of the best mode for carrying it out. It should be understood that not all features shown in the drawing or described in the associated text may be present in an actual device, in accordance with some embodiments of the invention. Furthermore, variations on the method and apparatus shown are included within the scope of the invention, which is limited only by the claims. Also, features of one embodiment may be provided in conjunction with features of a different embodiment of the invention. As used herein, the terms "have", "include" and "comprise" or their conjugates mean "including but not limited to."

The invention claimed is:

1. An imager comprising:
   a photosensitive surface;
   a light source which produces at least one scanning light beam;
   a deflector, arranged to deflect the at least one scanning light beam onto the photosensitive surface;
   a sensor which measures the orientation of the deflector;
   a controller operative to determine a placement error of the at least one scanning beam on the photosensitive surface, responsive to the orientation measurement by the sensor; and
   responsive to the displacement error, an actuator arranged to change the direction of deflection of the at least one light beam by the deflector,
   wherein:
       the sensor is an optical sensor configured to measure the orientation of the deflector substantially at a null in a vibrational mode of the deflector; and
       the sensor comprises:
           a second light source which produces a second light beam;
           a second deflector, fixed to the deflector or a support of the deflector, which deflects the second light beam; and
           an optical position sensor which measures a position of the deflected second light beam.

2. An imager according to claim 1 wherein the photosensitive surface is a moving surface.

3. An imager according to claim 2 wherein the controller determines the placement error relative to a desired position of the photosensitive surface.

4. An imager according to claim 2, wherein the moving photosensitive surface comprises the surface of a rotating cylinder.

5. An imager according to claim 1, wherein the second light source comprises a laser, and the second light beam strikes a surface of the optical position sensor at an oblique angle, thereby avoiding reflection of the second light beam from the optical position sensor back into the laser.

6. An imager according to claim 1, wherein the vibrational mode is a lowest frequency vibrational mode of the deflector.

7. An imager according to claim 6, wherein the vibrational mode is a torsional mode.

8. An imager according to claim 1, wherein the null is substantially at the center of the deflector in the scan direction.

9. An imager according to claim 1 wherein the deflection of the at least one scanning light beam is controlled in a closed loop control system, utilizing the sensor measurement as a feedback signal.

10. An imager according to claim 1, wherein the actuator is attached to at least one end of the deflector in the scan direction, and rotates the deflector around an axis substantially parallel to the scan direction.

11. An imager according to claim 1 wherein the deflector is a mirror.

12. An imager according to claim 1 wherein the deflector is a prism.

13. An imager according claim 1 wherein the imager is a printer or copier.

14. A method of producing an image on a photosensitive surface in an imager, wherein a cross-scan position of a scan line with respect to the photosensitive surface may vary from an expected position, the method comprising:

deflecting a scanning light beam, utilizing a deflector, such that the deflected scanning light beam falls on the photosensitive surface, thereby producing a plurality of lines of the image;

changing the orientation of the deflector, to correct an error in the cross-scan position of the lines on the photosensitive surface, caused by a variation;

measuring the orientation of the deflector using an optical sensor; and controlling a change in the orientation of the deflector in response to measuring the orientation of the deflector, wherein:

measuring the orientation of the deflector is made at a location on the deflector in the vicinity of a null of a vibrational mode of the deflector; and the measuring comprises:

reflecting a second light beam from a second deflector fixed to the deflector or to a support of the deflector; and measuring a position of the reflected second light beam.

15. A method according to claim 14 wherein the photosensitive surface is a moving surface.

16. A method according to claim 15, also including:

measuring a position of the photosensitive surface; and finding a difference between the measured position or orientation and an expected position or orientation;

wherein changing the orientation of the deflector comprises changing the orientation by an amount and in a direction which depends on the difference.

17. A method according to claim 15, wherein the moving photosensitive surface comprises the surface of a moving belt.

18. A method according to claim 14, wherein the vibrational mode is a lowest frequency vibrational mode.

19. A method according to claim 18, wherein the vibrational mode is a torsional mode.

20. A method according to claim 14, wherein the null is substantially at the center of the deflector in the scan direction.

21. A method according claim 14 wherein the deflection of the scanning light beam is controlled in a closed loop control system, utilizing a measurement of deflection as feedback signal.

22. An imager comprising:

a photosensitive surface;

a light source which produces at least one scanning light beam;

a deflector, arranged to deflect the at least one scanning light beam on to the photosensitive surface;

a sensor which measures the orientation of the deflector;

a controller operative to determine a placement error of the at least one scanning beam on the photosensitive surface, responsive to the orientation measurement by the sensor; and responsive to the displacement error, an actuator arranged to change the direction of deflection of the at least one light beam by the deflector, wherein:

the sensor is configured to measure the orientation of the deflector substantially at a null in a vibrational mode of the deflector; and the sensor comprises:

a second light source which produces a second light beam;

a second deflector, fixed to the deflector or a support of the deflector, which deflects the second light beam; and a second sensor which measures a position of the deflected second light beam.

* * * * *